United States Patent
Föhl

(10) Patent No.: US 6,364,236 B1
(45) Date of Patent: Apr. 2, 2002

(54) BELT TENSIONSER COUPLING WITH A ROTARY DRIVE UNIT

(76) Inventor: Artur Föhl, Auf der Halde 28, 73614 Schorndorf (DE)

(*) Notice: Subject to any disclaimer, the term of this patent is extended or adjusted under 35 U.S.C. 154(b) by 0 days.

(21) Appl. No.: 09/529,786

(22) PCT Filed: Oct. 28, 1997

(86) PCT No.: PCT/EP98/06838

§ 371 Date: Apr. 19, 2000

§ 102(e) Date: Apr. 19, 2000

(87) PCT Pub. No.: WO99/21740

PCT Pub. Date: May 6, 1999

(30) Foreign Application Priority Data

Oct. 28, 1997 (DE) .................................... 297 19 143U

(51) Int. Cl.[7] ............................ B60R 22/46; F16D 43/24
(52) U.S. Cl. ...................... 242/374; 192/71; 192/103 B
(58) Field of Search .................... 242/374; 280/806; 297/478; 192/46, 71, 103 R, 103 B, 103 C

(56) References Cited

U.S. PATENT DOCUMENTS

| 2,226,247 A | | 12/1940 | Lesage | |
|---|---|---|---|---|
| 5,730,384 A | * | 3/1998 | Fohl | 242/374 |
| 5,794,875 A | | 8/1998 | Schmid | |
| 5,918,717 A | * | 7/1999 | Fohl | 242/374 |

FOREIGN PATENT DOCUMENTS

| DE | 375047 | 3/1923 |
|---|---|---|
| EP | 0737606 | 4/1996 |
| GB | 793920 | 4/1958 |

* cited by examiner

Primary Examiner—John M. Jillions
(74) Attorney, Agent, or Firm—Tarolli, Sundheim, Covell, Tummino & Szabo L.L.P.

(57) ABSTRACT

A coupling between the rotor (16) of a belt tensioner rotary drive and a drive shaft (22) comprises an externally toothed coupling wheel (24) connected to the drive shaft (22) and at least one coupling pawl (32) arranged on the rotor (16). The coupling pawl (32) is movable between a resting position in which it is spaced away from the periphery of the coupling wheel and an engaging position in which it engages the coupling wheel. The coupling pawl (32) is toggle-mounted on a knife-edge bearing on the rotor (16).

8 Claims, 4 Drawing Sheets

BELT TENSIONSER COUPLING WITH A ROTARY DRIVE UNIT

The invention relates to a coupling between the rotor of a belt tensioner rotary drive and a drive shaft.

A coupling of this kind is known from German utility model 295 15 703.8. The drive shaft coupled to the belt reel of a belt retractor carries an externally toothed coupling wheel, into the toothing of which two coupling pawls swivel-mounted on the rotor are engageable. The coupling pawls are configured crowned at their end opposite the pawl tip and are supported over a large surface area by a correspondingly concavely shaped supporting surface area in a pocket bearing on the rotor to distribute the extremely high loads occurring in the coupling process both radially and circumferentially to a large supporting surface area.

The invention has the purpose of sophisticating this known coupling to the effect that the coupling process is accelerated and is already concluded when rotation of the rotor commences. In accordance with the invention the coupling pawl is toggle-mounted on a knife-edge bearing on the rotor. The invention is based on the idea that the large surface area contact between the coupling pawl and the supporting surface area which is favorable to distributing the load in the coupling process results in increased friction which delays the coupling process. When mounting the coupling pawl on a knife-edge bearing the friction is negligible so that no delay occurs in the coupling process. Despite mounting the coupling pawl on a knife-edge bearing, distribution of the loads over a large supporting surface area is lastly achieved. For one thing, namely, the coupling pawl, once having attained its engagement position, is able to contact the supporting surface over a large surface area. For another thing, the knife-edge bearing formed more particularly by a pointed protuberance may be deformed under load so that the pawl comes into contact with the supporting surface area by its side facing away from the pawl tip. The plastic deformation in the region of the knife-edge bearing is a desired effect by which the movement of the coupling pawl in contacting the toothing of the coupling wheel is damped. In the preferred embodiment this damping effect is enhanced by a plurality of additional deformation elements at the supporting surface area.

Further advantages and features of the invention read from the following description of several embodiments and are evident from the drawing to which reference is made and in which.

Figure 1:
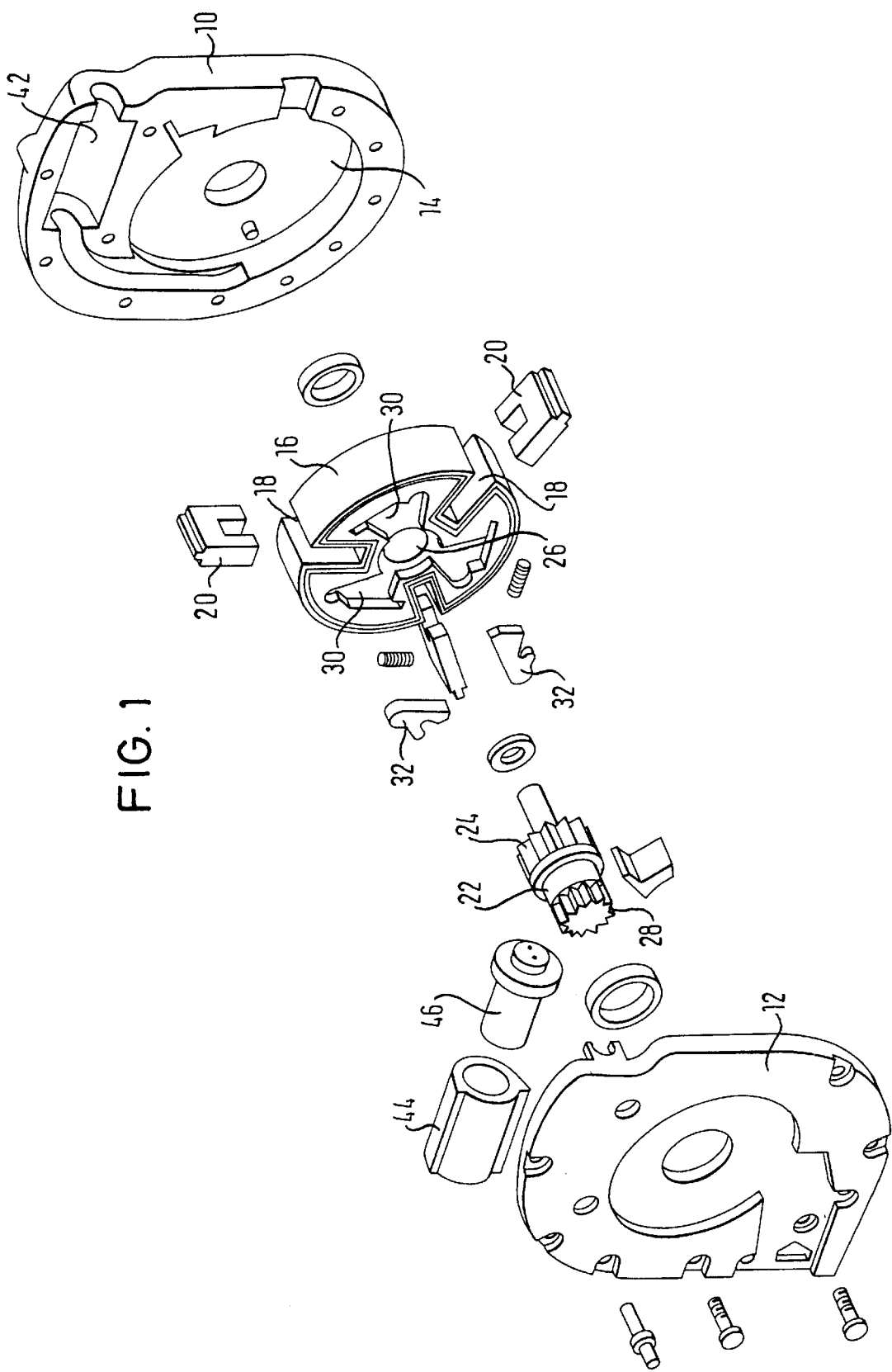
FIG. 1 is an exploded view of a belt tensioner rotary drive including the coupling.

The coupling is realized in the embodiment as described in a belt tensioner rotary drive applied laterally to a belt retractor. Configured in a housing formed by a main body 10 and a cover plate 12 is a working chamber 14 for accommodating a rotor 16. The rotor 16 comprises three radial slots 18, in each of which a lamella 20 is accommodated.

A drive shaft 22 carrying an externally toothed coupling wheel 24 is rotatively mounted in an axial hole 26 of the rotor 16. At one end the drive shaft 22 comprises a splined, serrated or polygonal toothing 28 or the like for nonrotatively coupling to a belt reel (not shown).

Formed in one side surface of the rotor 16 are several pocket bearings 30 for accommodating a coupling pawl 32. In the embodiment as shown three pocket bearings 30 are provided, of which at least two accommodate a coupling pawl 32.

Figure 3B:
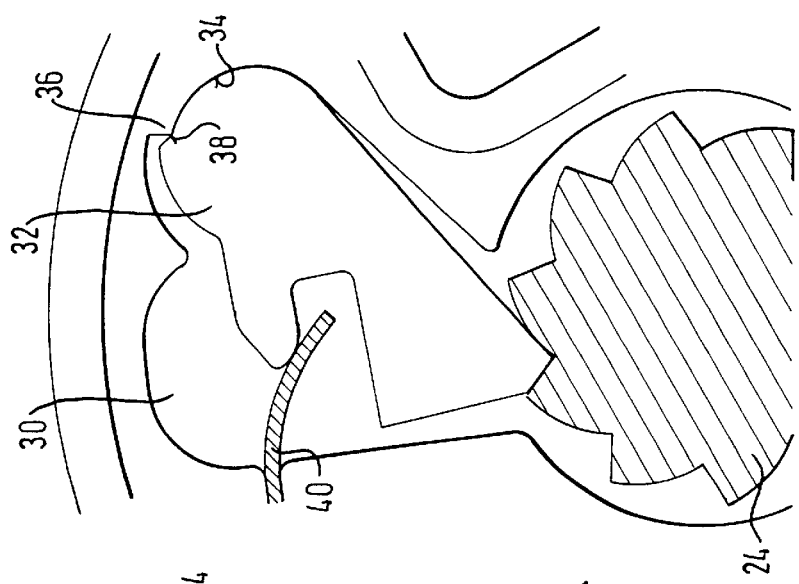
FIG. 3b shows the coupling in the engaged condition.
Figure 3A:
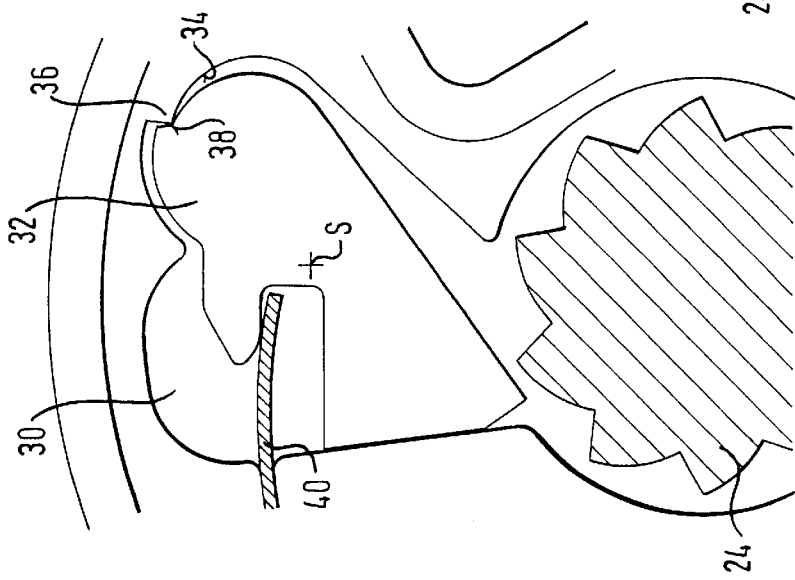
FIG. 3a is a detail view of the coupling on a magnified scale an d shown in the released condition.
Figure 2:
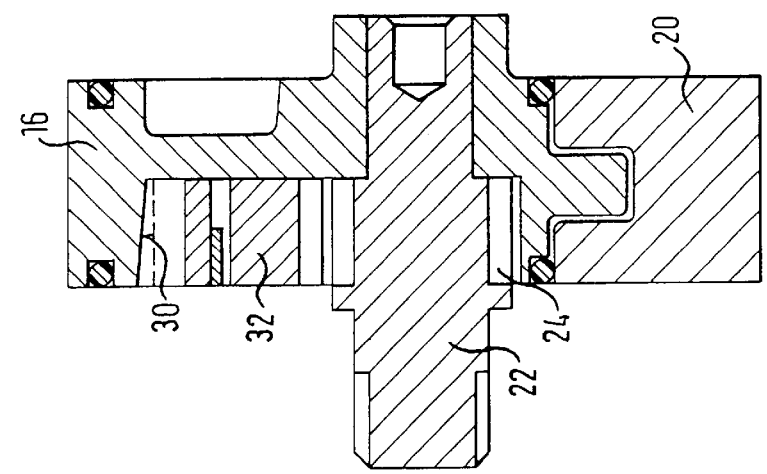
FIG. 2 is an axial section through the rotor as shown in FIG. 1.

Referring now to FIGS. 3a and 3b there is illustrated that the pocket bearing 30 comprises a supporting surface area 34 on which a knife-edge bearing is formed by a pointed protuberance 36. This knife-edge bearing engages a corresponding notch 38 of the coupling pawl 32. The coupling pawl 32 is thus toggle-mounted on the supporting surface area 34. In the resting position as shown in FIG. 3a the coupling pawl 32 is held by a flat section adjoining its pawl tip in contact with the supporting surface area 34 of the pocket bearing 30 by means of a return spring 40. The pawl tip is thus located at a defined spacing away from the periphery of the coupling wheel 24. The center of gravity S of the coupling pawl 32 is selected relative to the knife-edge bearing such that on rotation of the rotor 16 the coupling pawl 32 is deflected by mass inertia and urged into the external toothing on the periphery of the coupling wheel 24.

By two mutually opposed recesses in the main body 10 and in the cover plate 12 a space 42 is formed for accommodating a sleeve 44 in which a gas generator capsule 46 is inserted.

On activation of the gas generator capsule 46 compressed gases are released which impinge on the rotor 16, causing it to rotate.

Since belt tensioning needs to be concluded within a few milliseconds, the rotor 16 experiences on commencement of its rotation an extremely high rotary acceleration, correspondingly high being the forces of mass inertia causing a deflection of the coupling pawls 32 in the direction of the coupling wheel 24. These forces are supported by the mounting of the coupling pawls. Since both coupling pawls 32 are mounted on a knife-edge bearing, the friction forces are, however, negligible. Accordingly, the engaging movement of the coupling pawls 32 is not delayed by the influence of friction.

Referring now to FIG. 3b there is illustrated a coupling pawl 32 in the engaged condition in which the pawl tip positively engages the external toothing of the coupling wheel 24. In this condition the crowned end of the coupling pawl 32 is in contact over a large surface area with the correspondingly concavely shaped supporting surface area 34.

The coupling pawls 32 are mutually staggered in the circumferential direction of the rotor 16 in such a way that should the tip of one coupling pawl clash with the tip of a tooth on the periphery of the coupling wheel 24, the tip of another coupling pawl engages the gap between two successive teeth on the coupling wheel 24.

Figure 4A:
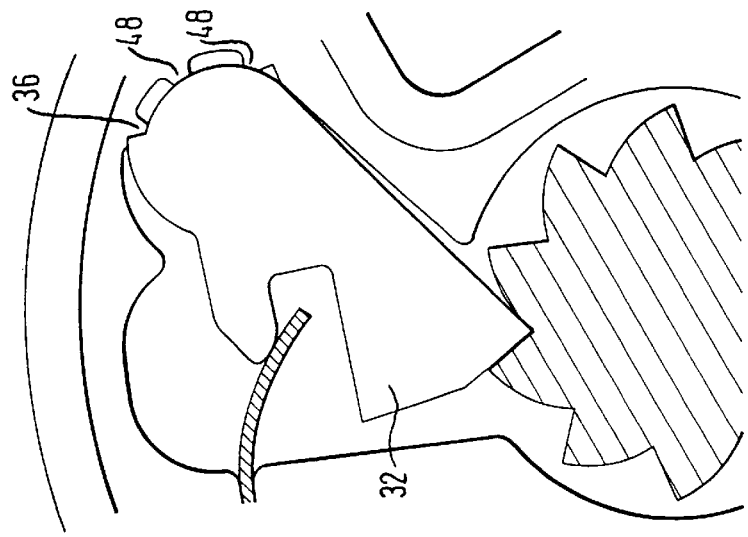
FIGS. 4a and 4b show a variant of the coupling in the released condition and engaged condition.
Figure 4B:
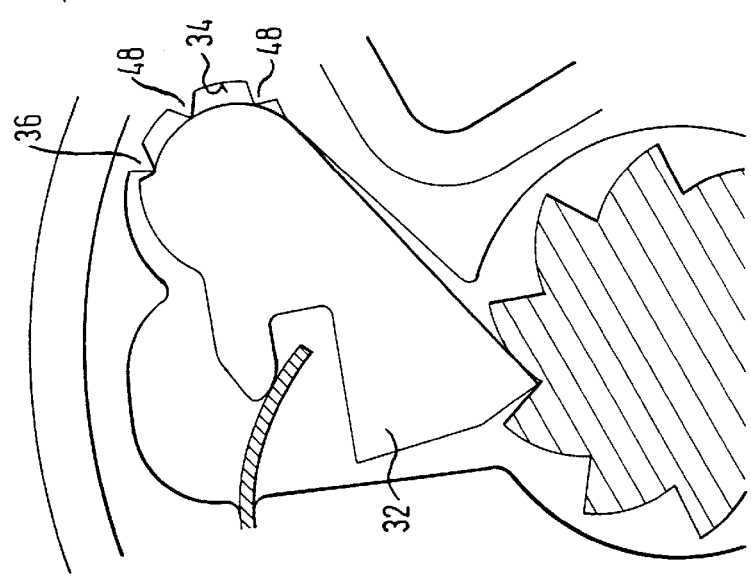

Referring now to FIGS. 4a and 4b there is illustrated an embodiment in which means are provided to damp the movement of the coupling pawl 32 in contacting the external toothing of the coupling wheel 24. A damping of this kind largely prevents the coupling pawl from bouncing back out of contact with the coupling wheel during the coupling process, as a result of which a further acceleration of the coupling process is achieved. Arranged adjacent to the pointed protuberance 36 forming the knife-edge bearing and in the direction of rotation of the rotor behind the knife-edge bearing are two deformation elements, each of which is formed by a pointed protuberance 48 on the supporting surface area 34. As evident from FIG. 4b the coupling pawl 32 in the engaged condition is located with its crowned end in contact with the tips of the protuberances 36 and 48. Since the belt reel connected to the drive shaft 22 with the belt webbing wound thereon acts against the commencing rotary movement by its mass inertia, a high load acts on the coupling pawl 32 both radially and circumferentially. This load is absorbed by the supporting surface area 34 via the pointed protuberances 36 and 48, resulting in a plastic deformation of these protuberances 36 and 48 to thus achieve the desired damping effect.

Figure 5:
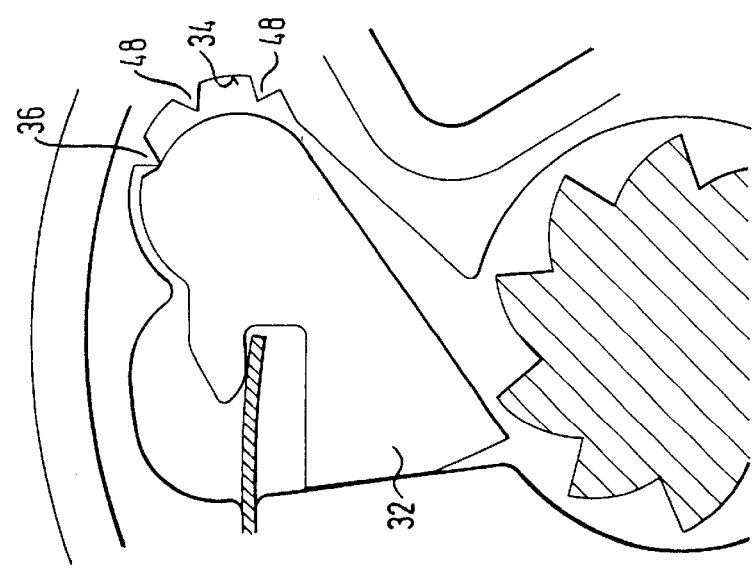
FIGS. 5 to 7 show three variants of the coupling, each in the engaged condition.
Figure 7:
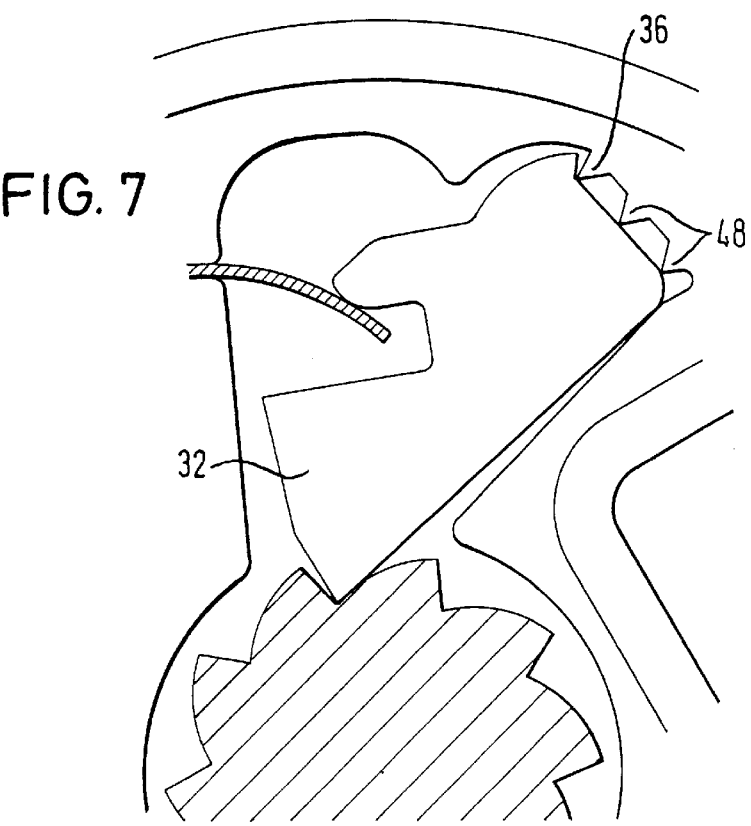
Figure 6:
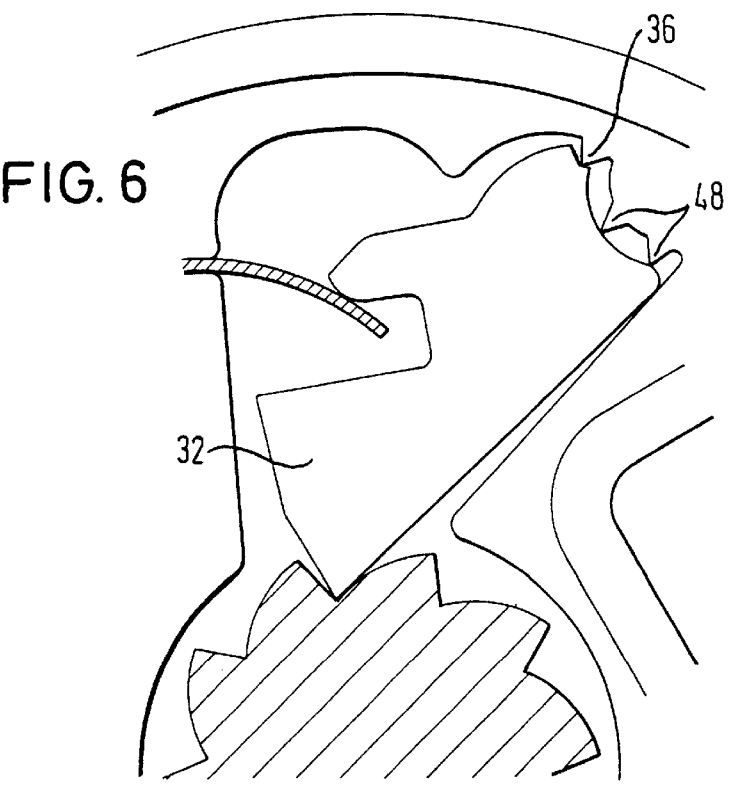

Referring now to FIGS. 5 to 7, variants are illustrated differing from the embodiment as shown in FIGS. 4a and 4b merely by the shape and arrangement of the pointed protuberances which form the knife-edge bearing and the deformation elements as well as by the shape of the coupling pawls being adapted under load. This is why as shown in FIG. 5 the protuberances are configured less pointed. In FIG. 6 the end of the coupling pawl 32 supported by the pointed protuberances is not crowned convex but concave. In FIG. 7 the tips of the protuberances are located in a single plane, and the supported end of the coupling pawl 32 is correspondingly plane.

What is claimed is:

1. A coupling between the rotor (16) of a belt tensioner rotary drive and a drive shaft (22), including an externally toothed coupling wheel (24) connected to said drive shaft (22) and at least one coupling pawl (32) which is arranged on said rotor (16) and is movable between a resting position in which it is located spaced away from the periphery of said coupling wheel and an engaging position in which it engages said coupling wheel, characterized in that said coupling pawl (32) is toggle-mounted on a knife-edge bearing (36) on said rotor (16) and the center of gravity (s) of said coupling pawl (32) relative to said knife-edge bearing (36) is selected such that on commencement of rotation of said rotor (16) said coupling pawl (32) is deflected by mass inertia into the engaging position.

2. The coupling as set forth in claim 1, characterized in that said knife-edge bearing (36) is formed in a pocket bearing (30) accommodating said coupling pawl (32) on said rotor (16).

3. The coupling as set forth in claim 1, characterized in that said coupling pawl (32) comprises at its end facing away from the pawl tip a notch (38) in which said knife-edge bearing (36) engages.

4. The coupling as set forth in claim 2, characterized in that said pocket bearing (30) comprises supporting surface areas (34) supporting said coupling pawl (32) in its engaging position.

5. The coupling as set forth in claim 4, characterized in that said supporting surface areas (34) accommodate both radial and peripheral components of the load.

6. The coupling as set forth in claim 4, characterized in that at least one deformation element (48) damping the movement of said coupling pawl (32) in contacting said coupling wheel (24) is arranged on said supporting surface area (34).

7. The coupling as set forth in claim 6, characterized in that said deformation element is formed by a pointed protuberance (48) on said supporting surface area (34).

8. The coupling as set forth in claim 6, characterized in that a plurality of deformation elements (48) is arranged spaced away from each other on said supporting surface area (34) in the direction of rotation of said rotor (16) behind said knife-edge bearing (36).

* * * * *

UNITED STATES PATENT AND TRADEMARK OFFICE
CERTIFICATE OF CORRECTION

PATENT NO. : 6,364,236 B1
DATED : April 2, 2002
INVENTOR(S) : Artur Fohl

It is certified that error appears in the above-identified patent and that said Letters Patent is hereby corrected as shown below:

<u>Title page,</u>
Item [22], PCT Filed, replace "Oct. 28, 1997" with -- Oct. 28, 1998 --.

Signed and Sealed this

Fourth Day of February, 2003

JAMES E. ROGAN
*Director of the United States Patent and Trademark Office*